(12) United States Patent
Konishi et al.

(10) Patent No.: US 8,325,784 B2
(45) Date of Patent: Dec. 4, 2012

(54) COMMUNICATION APPARATUS, COMMUNICATION METHOD, AND INTEGRATED CIRCUIT

(75) Inventors: Taisuke Konishi, Fukuoka (JP); Nobuhiko Noma, Fukuoka (JP); Nobutaka Kodama, Fukuoka (JP); Hisao Koga, Fukuoka (JP); Shigeo Yoshida, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1130 days.

(21) Appl. No.: 12/202,001

(22) Filed: Aug. 29, 2008

(65) Prior Publication Data

US 2009/0060061 A1 Mar. 5, 2009

(30) Foreign Application Priority Data

Aug. 31, 2007 (JP) ................ P2007-225804

(51) Int. Cl.
*H04B 1/00* (2006.01)
(52) U.S. Cl. ........ 375/146; 375/145; 375/365; 370/500; 370/509; 370/510
(58) Field of Classification Search .......... 375/145, 375/146, 149, 219, 220, 222, 257, 260, 295, 375/365, 366; 370/203, 500, 506, 509, 510, 370/512, 513, 514
See application file for complete search history.

(56) References Cited

U.S. PATENT DOCUMENTS

| | | | |
|---|---|---|---|
| 6,498,808 B1 * | 12/2002 | Tzannes | 375/225 |
| 7,436,757 B1 * | 10/2008 | Wilson et al. | 370/203 |
| 7,619,963 B2 * | 11/2009 | Abe et al. | 370/208 |
| 2004/0131110 A1 | 7/2004 | Alard | |
| 2005/0018784 A1 | 1/2005 | Kurobe | |
| 2006/0109924 A1 | 5/2006 | Koo | |
| 2007/0002728 A1 | 1/2007 | Fujii | |
| 2009/0097455 A1 * | 4/2009 | Hoffmann et al. | 370/335 |
| 2010/0104040 A1 * | 4/2010 | Seki | 375/267 |

FOREIGN PATENT DOCUMENTS

| | | |
|---|---|---|
| EP | 1 249 955 | 10/2002 |
| EP | 1 542 488 | 6/2005 |
| GB | 2 425 024 | 10/2006 |
| JP | 2002-84332 | 3/2002 |
| JP | 2006-352492 | 12/2006 |
| WO | 02/13448 | 2/2002 |
| WO | 2005/011226 | 2/2005 |
| WO | 2006/019579 | 2/2006 |

OTHER PUBLICATIONS

International Search Report dated Feb. 23, 2009.
Lestable, T. et al: "Adaptive pilot pattern for multi-carrier spread-spectrum (MC-SS) transmission systems," Proceedings of the IEEE Vehicular Technology Conference (VTC) Fall, vol. 1, Sep. 26, 2004, pp. 385-388.

* cited by examiner

*Primary Examiner* — Dac Ha
(74) *Attorney, Agent, or Firm* — Dickinson Wright PLLC

(57) ABSTRACT

A communication apparatus is connected to a transmission channel for transmitting data to another communication apparatus. The communication apparatus includes: a communication frame generator which generates a communication frame for storing the data; and a controller which controls to insert a pilot symbol into the communication frame based on a state of the transmission channel.

35 Claims, 10 Drawing Sheets

COMMUNICATION APPARATUS, COMMUNICATION METHOD, AND INTEGRATED CIRCUIT

BACKGROUND

1. Technical Field

The present invention relates to a communication apparatus, a communication method, and a communication system capable of carrying out communication using communication parameters suitable to states of a transmission channel.

2. Background Art

When impulse noise or phase fluctuation occurs in a transmission channel such as communication using a power line or mobile wireless communication or when the amplitude or phase of a reception signal varies due to fading or the like, distortion may occur in the reception signal, thereby increasing a bit error of reception data.

As a method of solving such a problem, a method of inserting a pilot symbol into a reception signal is disclosed in Patent Document 1 (JP-A-2002-84332) and Patent Document 2 (JP-A-2006-352492), for example. The pilot symbol is a known signal. Generally, the plural pilot symbols are inserted at periodic interval. Accordingly, since a characteristic of a transmission channel can be newly estimated (that is, variation in a state of the transmission channel is detected) by monitoring the phase or amplitude of the reception signal in a block of the pilot symbols, an increase in the bit error can be avoid by equalizing the reception signal on the basis of the state of the newly estimated transmission channel.

FIG. 11 is a diagram illustrating an example of a frame format of a communication frame when the pilot symbol is inserted. As shown in FIG. 11, the communication frame includes a preamble PR, frame control data FC, an information symbol (payload) PLD, and a pilot symbol PLT. The preamble PR is data used for symbol synchronization, equalization coefficient calculation, and the like. The frame control data FC is control data used to control information on a transmission source address, a transmission destination address, a form (length of a frame, etc.) of the payload, etc. The payload includes the information symbol PLD and the pilot symbol PLT. The pilot symbol PLT having an M length is inserted into every information symbol PLD having an N length.

The pilot symbol PLT is the known data, as described above, and data which do not contribute to information transmission. Accordingly, when communication is carried out using frames having such a structure, transmission efficiency is reduced as many as the number of the pilot symbols PLT, compared to a case where the pilot symbol PLT is not inserted. In the example of FIG. 11, the transmission efficiency is reduced by the maximum M/(N+M).

When communication is carried out using the communication parameters suitable for states of a transmission channel, the states of the transmission channel are estimated by a channel estimation (hereinafter, also referred to as CE) and a new communication parameter is obtained on the basis of the estimated result. Subsequently, it is confirmed by a CE training process in which one of a current (in use) communication parameter and the newly obtained communication parameter is more suitable for the state of the transmission channel to determine the communication parameter to be used.

The CE training process is disclosed in Patent Document 3 (WO05/011226A), for example.

SUMMARY

The embodiment described later is devised in view of such a circumstance and an object is to provide a communication apparatus, a communication method, and an integrated circuit capable of avoiding reduction of transmission efficiency caused due to variation in a state of a transmission channel.

According to an aspect of the embodiment described later, there is provided a communication apparatus which is connected to a transmission channel to transmit data to another communication apparatuses. The communication apparatus includes a communication frame generator which generates a communication frame for storing the data and a controller which controls to insert a pilot symbol into the communication frame based on a state of the transmission channel.

According to the communication apparatus having the above-described configuration, the inserting of the pilot symbol in the communication frame is controlled on the basis of the state of the transmission channel. Therefore, since it is possible to appropriately insert the pilot symbol in the communication frame, reduction of transmission efficiency caused due to redundancy of the pilot symbol can be avoided.

According to the embodiment as described later, a communication method of transmitting data to another communication apparatus through a connected transmission channel, the method including generating a communication frame for storing the data, and controlling to insert a pilot symbol into the communication frame based on a state of the transmission channel.

In the communication method according to the first aspect of the invention, the inserting of the pilot symbol in the communication frame is controlled on the basis of the state of the transmission channel. Therefore, since it is possible to appropriately insert the pilot symbol in the communication frame, the reduction of the transmission efficiency caused due to the redundancy of the pilot symbol can be reduced.

According to the embodiment as described later, there is provided an integrated circuit which is connected to a transmission channel and used in a communication apparatus capable of transmitting data to other communication apparatuses. The integrated circuit includes a communication frame generator which generates a communication frame for storing the data, and a controller which controls to insert a pilot symbol into the communication frame based on a state of the transmission channel.

In the integrated circuit having the above-described configuration, the inserting of the pilot symbol in the communication frame is controlled. Therefore, since it is possible to appropriately insert the pilot symbol in the communication frame, the reduction of the transmission efficiency caused due to the redundancy of the pilot symbol can be reduced.

As apparent from the above-described invention, the communication apparatus, the communication method, and the integrated circuit are capable of reducing transmission efficiency while avoiding inserting a redundant pilot symbol.

DETAILED DESCRIPTION

Hereinafter, an exemplary embodiment of the invention will be described with reference to the drawings.

Figure 1:
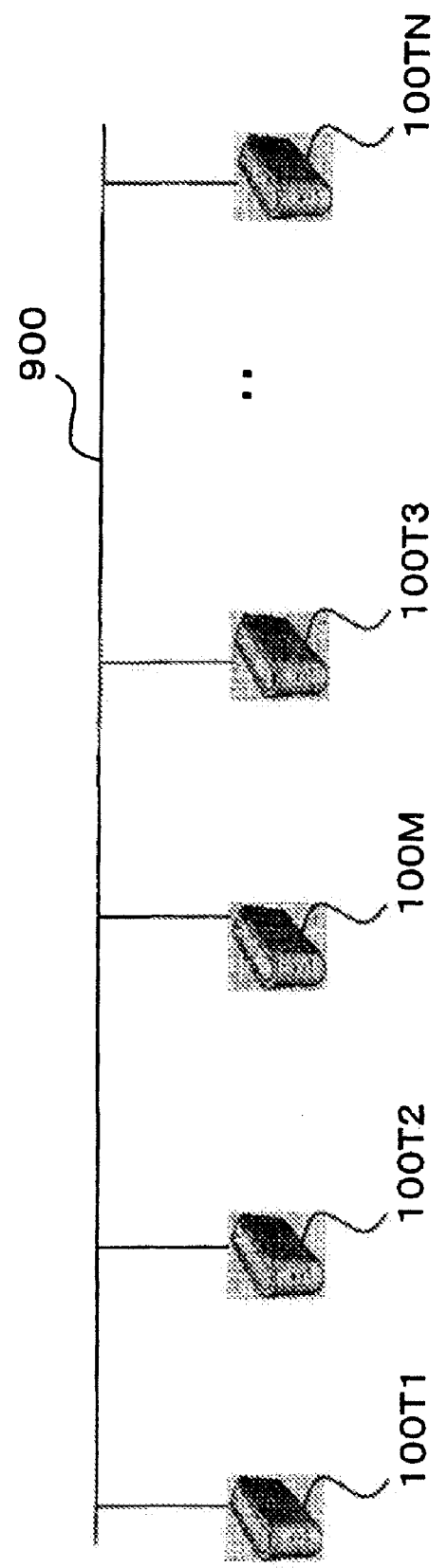
FIG. 1 is a diagram illustrating an example of an overall configuration of a power line communication system.

As shown in FIG. 1, a power line communication system includes a plurality of PLC (Power Line Communication) modems 100M, 100T1, 100T2, 100T3, and 100T4 connected to a power line 900. In the power line communication system shown in FIG. 1, five PLC modems are illustrated, but arbitrary number of the PLC modems is used. The PLC modem 100M functions as a master modem and manages a connection state (link state) of the other PLC modems 100T1 to 100T4 each functioning as a slave modem. However, the PLC modem functioning as the master modem is not always needed.

In the following description, terms of the PLC modems 100M, 100T1, 100T2, 100T3, and 100T4 are used when the master modem and the specific slave modems are mentioned, and a term of the PLC modems 100T is used when the slave modems are mentioned on the whole. In addition, a term of the PLC modems 100 is used when the PLC modems are mentioned without specifying the master modem and the slave modems.

The power line 900 is illustrated as one conductive wire in FIG. 1, but is actually two or more conductive wires. The PLC modems 100 are each connected to two wires of the conductive wires.

As described below, the PLC modems 100 have a modular jack for the LAN (Local Area Network) such as the RJ45. A television (TV), a personal computer (PC), an IP telephone, a recorder, and a broadband router are connected to the modular jack (these elements are not shown in figures). The broadband router is connected to the Internet. In addition, the power line communication system is an example of a communication system capable of realizing a communication method according to the invention and may be another communication system such as in a wireless LAN or the like.

Figure 2A:
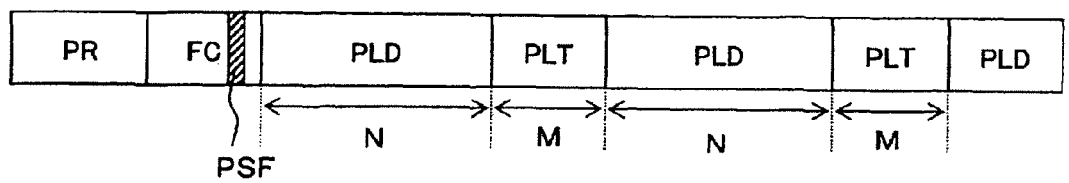
FIG. 2A is a diagram illustrating an example of a frame format, in which a pilot symbol is inserted, used in the power line communication system.
Figure 2B:
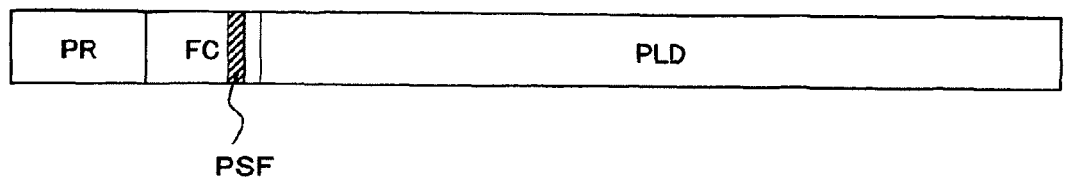
FIG. 2B is a diagram illustrating an example of a frame format, in which the pilot symbol is not inserted, used in the power line communication system.

In communication between the PLC modems 100, a communication parameter suitable to a state of a power line as a transmission channel is used and two types of communication frame format shown in FIG. 2 are selectively used. The frame format shown in FIG. 2A is a frame in which a pilot symbol PLT is inserted. The frame format shown in FIG. 2B is a frame in which the pilot symbol PLT is not inserted. As shown in FIG. 2A, it is preferable that plural pilot symbols PLT are inserted at periodic interval. The pilot symbol PLT is known data. In a receiving device, the pilot symbol PLT is used to analyze a phase reference or perform synchronization with a transmitting device.

Figure 11:
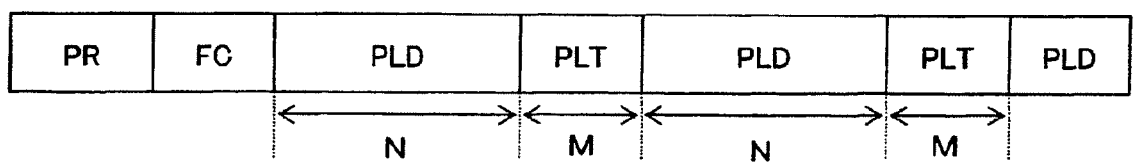
FIG. 11 is a diagram illustrating an example of a frame format of a communication frame where a pilot symbol is inserted.

The two types of frame formats illustrated in FIG. 2 are almost the same one another except that the pilot symbol PLT is inserted or not. The frame formats include a preamble PR, frame control data FC, and an information symbol (payload) PLD, as show in FIG. 11. The preamble PR is data used for symbol synchronization, equalization coefficient calculation, and the like. The frame control data FC is data used to control information such as a transmission source address, a transmission destination address, a form (frame length or the like) of the payload. The payload includes plural information symbols PLD and plural pilot symbols PLT in the frame format shown in FIG. 2A, but includes only an information symbol PLD in the frame format shown in FIG. 2B. In addition, a length N of the information symbol PLD and a length M of the pilot symbol PLT can be variably controlled. For example, when the state of the transmission channel is not good, the length M of the pilot symbol PLT is made lengthened to ensure communication stability. In contrast, when the state of the transmission channel is good, the length M of the pilot symbol PLT is made shortened to ensure transmission efficiency.

Moreover, it is possible to change the number of the pilot symbols PLT in accordance with the state of the transmission channel. Generally, when the state of the transmission channel is not good, a characteristic of the transmission channel is likely to be deteriorated. In this case, if number of the pilot symbols is low in the communication frame, it becomes difficult to surely complement the deterioration of the characteristic of the transmission channel in the receiving device. Accordingly, when the state of the transmission channel gets worse, it is desirable to stabilize the communication by increasing number of the pilot symbols. In contrast, when the state of the transmission channel gets better, the number of the pilot symbols may be decreased to improve the transmission efficiency.

The frame control data FC includes a pilot symbol flag PSF which is information on whether to insert pilot symbol PLT. When the pilot symbol PLT is inserted, "1" is assigned to the pilot symbol flag PSF and when the pilot symbol PLT is not inserted, "0" is assigned to the pilot symbol flag PSF. When the pilot symbol flag PSF is "1" (that is, the pilot symbol PLT is inserted), information on the length N of the information symbol PLD, information on the length M of the pilot symbol PLT, and information on a period (interval at which the pilot symbols PLT are inserted) of the pilot symbols PLT, information on the number of the pilot symbols PLT, etc. are included in the frame control data FC. When the length M of the pilot symbol PLT is set to be variable, it is preferable to include information on the length M of the pilot symbol PLT. That is because the information on the length M of the pilot symbol PLT is one of important data used to analyze the communication frame on a receiving side and extracting necessary data from the payload.

In this way, the receiving side can surely determine whether to contain the pilot symbol PLT in the payload and extract only the necessary data, since the pilot symbol flag PSF indicating whether to contain the pilot symbol PLT in the frame control data FC is contained.

Figure 3C:
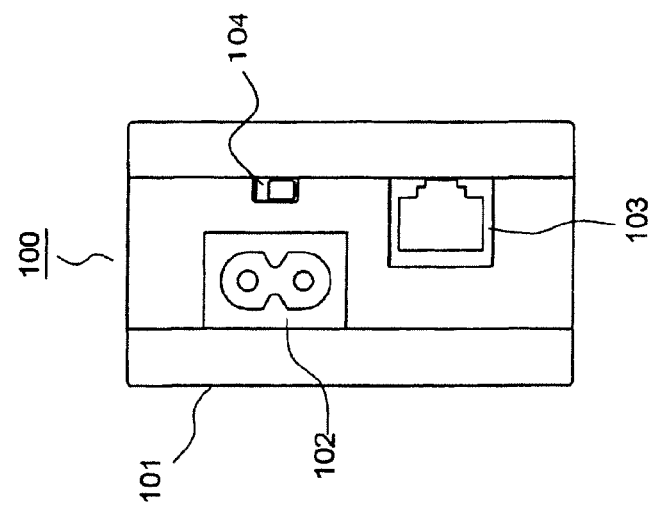
FIG. 3C is a back view illustrating the appearance of the PLC modem.
Figure 3B:
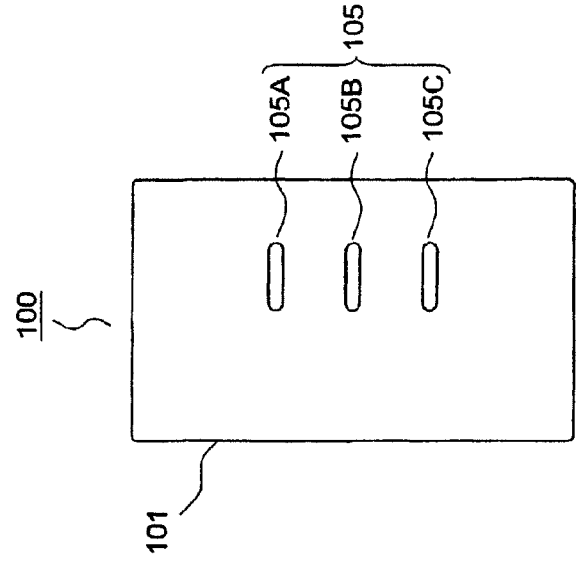
FIG. 3B is a front view illustrating the appearance of the PLC modem.
Figure 3A:
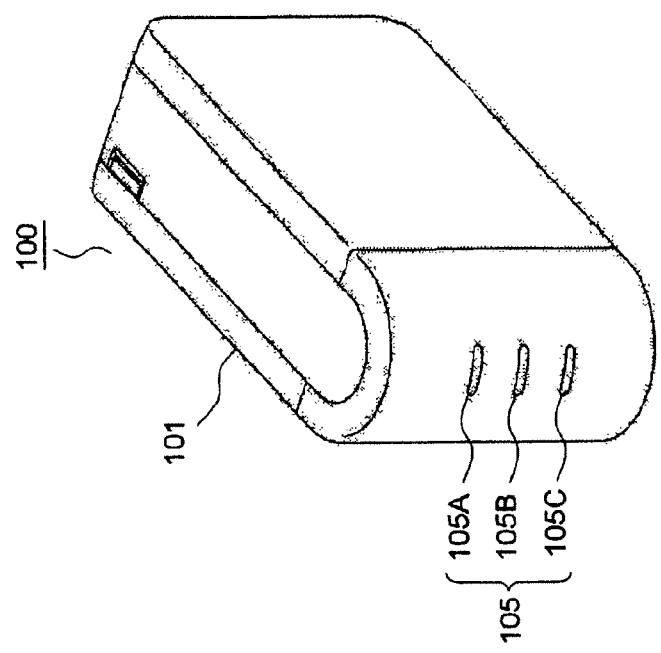
FIG. 3A is a perspective view illustrating an appearance of a PLC modem.

As shown in FIG. 3, the PLC modems 100 include a casing 101. As shown in FIGS. 3A and 3B, an indicator 105 constituted by LEDs (Light Emitting Diodes) 105A, 105B, and 105C is provided on a front surface of the casing 101. In addition, as shown in FIG. 3C, a power connector 102, a modular jack 103 for the LAN (Local Are Network) such as the RJ45, and a switch 104 which switches operation modes or the like are provided on a rear surface of the casing 101. A power cable (not shown in figures) is connected to the power connector 102 and a LAN cable (not shown in figures) is connected to the modular jack 103. In addition, a Dsub (D-subminiature) connector is provided in the PLC modems 100 to connect a Dsub cable.

Figure 4:
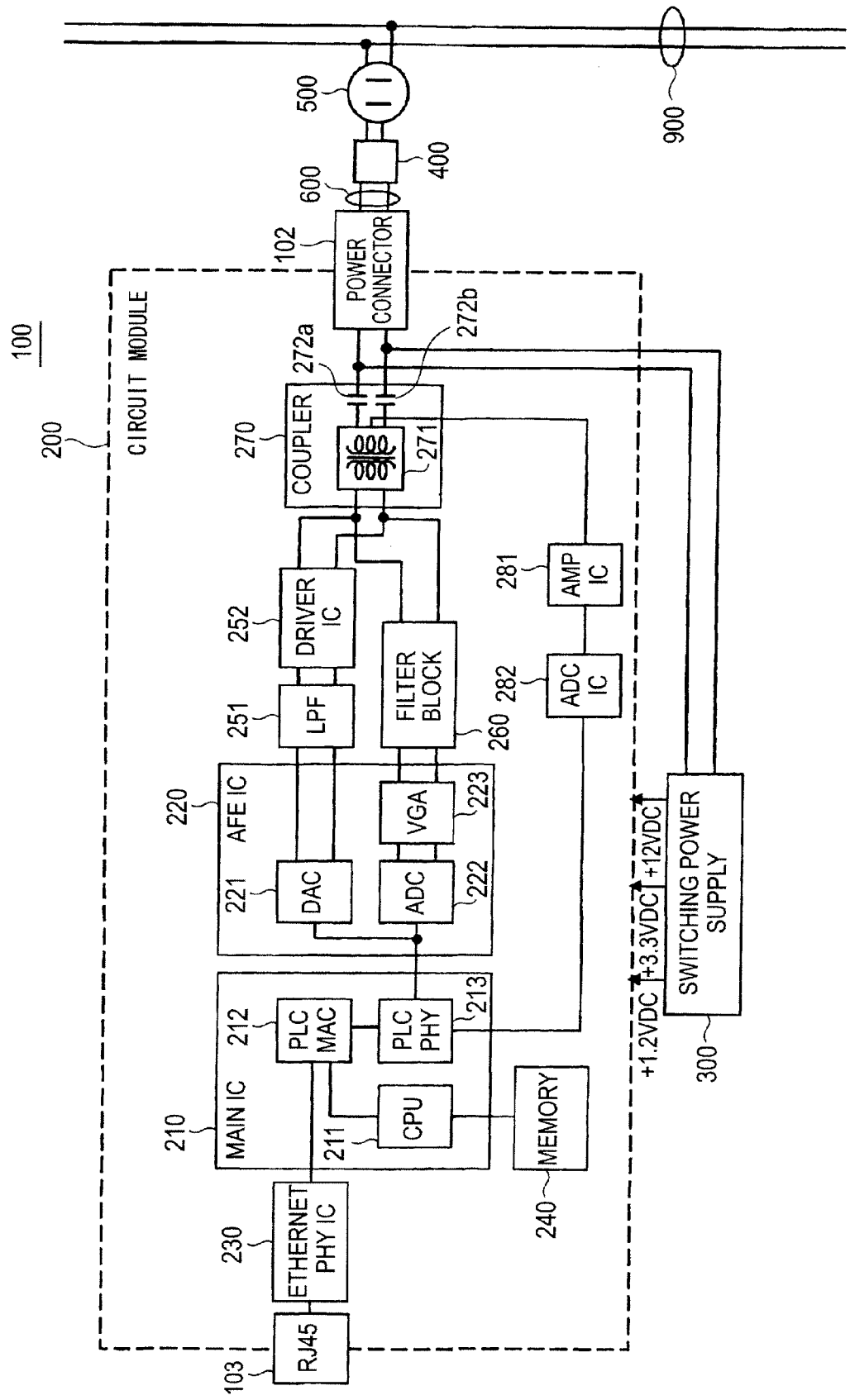
FIG. 4 is a block diagram illustrating an example of hardware of the PLC modem.

As shown in FIG. 4, the PLC modems 100 each include a circuit module 200 and a switching power supply 300. The switching power supply 300 supplies various kinds of voltage (for example, +1.2 V, +3.3 V, or +12 V) to the circuit module 200. For example, the switching power supply 300 is configured to include a switching trance and a DC-DC converter (which are all not shown).

The circuit module 200 includes a main IC (Integrated Circuit) 210, an AFE IC (Analog Front END Integrated Circuit) 220, an Ethernet PHY IC (Physical layer Integrated Circuit) 230, a memory 240, a low-pass filter (LPF) 251, a driver IC 252, a band-pass filter (BPF) 260, and a coupler 270. The switching power supply 300 and the coupler 270 are connected to a power connector 102 and connected to the power line 900 via a power cable 600, a power plug 400, and an outlet 500. The main IC 210 also functions as a control circuit which carries out power line communication.

The main IC 210 includes a CPU (Central Processing Unit) 211, a PLC MAC (Power Line Communication Media Access Control layer) block 212, and a PLC PHY (Power Line Communication Physical layer) block 213. The CPU 211 mounts a 32-bit RISC (Reduced Instruction Set Computer) processor. The PLC MAC block 212 manages a MAC layer (Media Access Control layer) of transmitting and receiving signals. The PLC PHY block 213 manages a PHY layer (Physical layer) of transmitting and receiving signals. The AFE IC 220 includes a DA converter (DAC: D/A Converter) 221, an AD converter (ADC: A/D Converter) 222, and a variable gain amplifier (VGA: Variable Gain Amplifier) 223. The coupler 270 includes a transformer coil 271 and coupling capacitors 272a and 272b. The CPU 211 controls operations of the PLC MAC block 212 and the PLC PHY block 213 using data stored in the memory 240 and also controls the entire PLC modems 100.

Communication by the PLC modems 100 is carried out in the following manner. That is, data input from the modular jack 103 is transmitted to the main IC 210 through the Ethernet PHY IC 230 and a digital transmission signal is generated by digital signal processing. The generated digital transmission signal is converted into an analog signal by the DA converter (DAC) 221 of the AFE IC 220 and the converted analog signal is output to the power line 900 via the low-pass filter 251, the driver IC 252, the coupler 270, the power connector 102, the power cable 600, the power plug 400, and the outlet 500.

The analog signal transmitted from the power line 900 is transmitted to the band-pass filter 260 via the coupler 270. After the analog signal is subjected to gain adjusting by the variable gain amplifier (VGA) 223 of the AFE IC 220, the analog signal is converted into a digital signal by the AD converter (ADC) 222. Subsequently, the converted digital signal is transmitted to the main IC 210 and is converted into digital data by the digital signal processing. The converted digital data is output from the modular jack 103 through the Ethernet PHY IC 230.

An example of the digital signal processing performed by the main IC 210 will be described. The PLC modems 100 carries out carrier communication using plural sub-carriers by an OFDM (Orthogonal Frequency Division Multiplexing) technique. The PLC modems 100 convert transmission data into an OFDM transmission signal and digital processing of converting an OFDM reception signal into reception data is mainly performed by the PLC PHY block 213.

Figure 5:
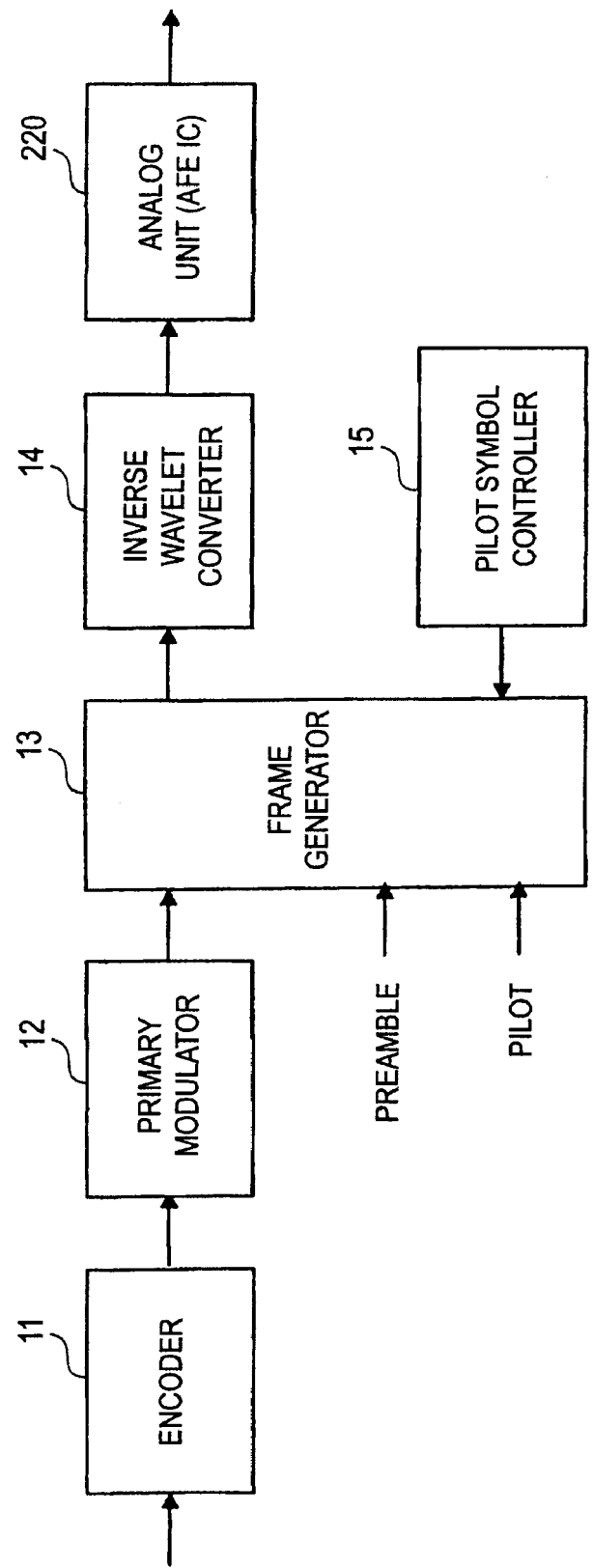
FIG. 5 is a functional block diagram illustrating an example of digital signal processing at transmitting time in the PLC modem.
Figure 6:
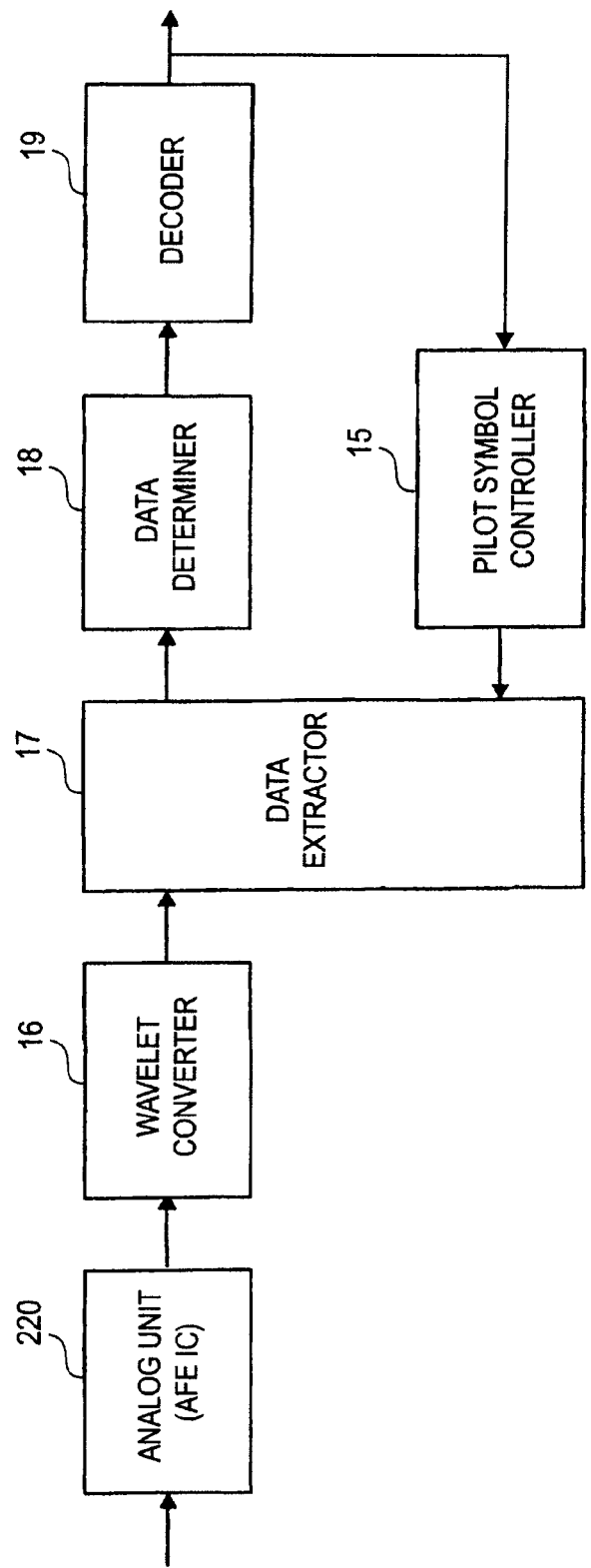
FIG. 6 is a functional block diagram illustrating an example of digital signal processing at receiving time in the PLC modem.

As shown in FIGS. 5 and 6, the PLC PHY block 213 has functions of a encoder 11, a primary modulator 12, a frame generator 13, an inverse wavelet converter 14, a pilot symbol controller 15, a wavelet converter 16, a data extractor 17, a data determiner 18, and a decoder 19.

The encoder 11 codes input data into a predetermined error correction code. The input data includes information to be transmitted and frame control data. The primary modulator 12 converts bit data to be transmitted from the encoder 11 into symbol data and performs a primary modulation (for example, a PAM modulation) in accordance with the symbol data. The frame generator 13 generates a frame having a predetermined format on the basis of serial data subjected to the primary modulation (symbol mapping) and converts the serial data into parallel data.

In the generation of the frame in the frame generator 13, the frames of the formats shown in FIGS. 2A and 2B are generated using a signal, which is used to control whether the pilot symbol is inserted from the pilot symbol controller 15, preamble data, and pilot symbol data. The preamble data and the pilot symbol data stored in the memory 240 are used, for example.

The inverse wavelet converter 14 performs an inverse converting process on the parallel data from the frame generator 13 to generate data on a time axis and generate a sample value series indicating transmission symbol. The data is transmitted to the DA converter (DAC) 221 of the analog unit (AFE IC) 220.

As described below, the pilot symbol controller 15 acquires a state of the power line as the transmission channel, acquires a communication parameter on the basis of the acquired state of the power line, and determines whether to be necessary to insert the communication parameter and the format of the communication frame, for example, the pilot symbol used for communication, using the acquired communication parameter.

The wavelet converter 16 performs a discrete wavelet converting process on the digital data (sample value series sampled at the same sample rate as that at transmission time) obtained from the AD converter (ADC) 222 of the AFE IC 220 to generate data on a frequency axis. The data extractor 17 converts parallel data on the frequency axis into serial data and extracts valid data (payload other than the frame control data and the pilot symbol) from the converted data. When the valid data is extracted, a control signal from the pilot symbol controller 15 is used. The data determiner 18 calculates the amplitude of each sub-carrier and determines the reception signal to obtain the reception data.

The decoder 19 performs an error correction process on the reception data to obtain the frame control data and the payload. The obtained frame control data is transmitted to the pilot symbol controller 15 to be used for an extraction process of the data extractor 17. For example, the extraction process from the payload is changed depending on "1" or "0" of the pilot symbol flag.

As described above, the PLC PHY block 213 of the main IC 210 generates the transmission signal and extracts the reception signal by performing various types of digital signal processing. However, the main IC 210 has a function of acquiring the state of the transmission channel, a function of acquiring the communication parameter on the basis of the state of the transmission channel, and a function of determining the communication parameter and the frame format of the communication frame used for communication. These functions will be described in detail below.

Figure 7:
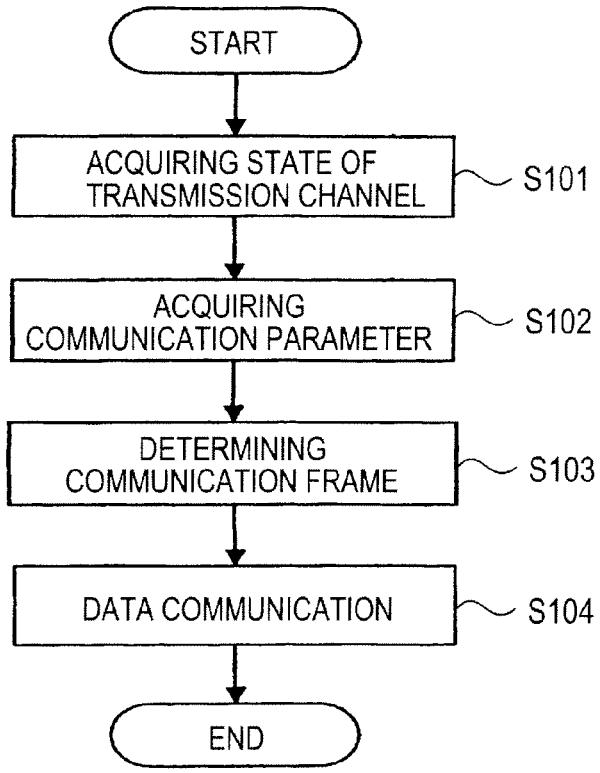
FIG. 7 is a flowchart illustrating overall operations in the power line communication system.
Figure 8A:
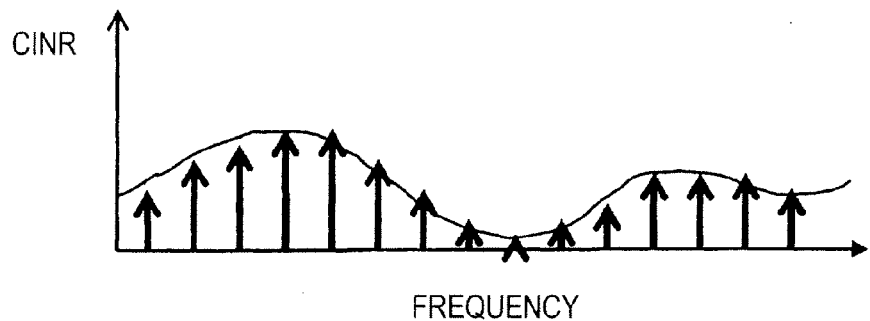
FIGS. 8A and 8B are diagrams illustrating an example of assignment of information bits to each sub-carrier in the power line communication system.
Figure 8B:
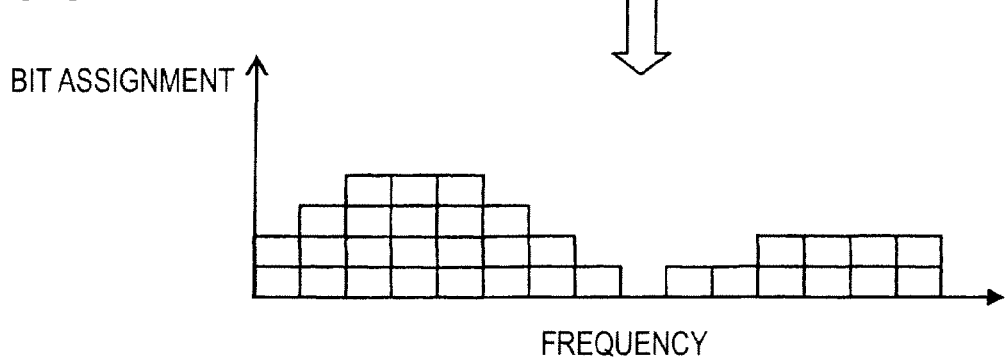

FIG. 7 is a schematic flowchart illustrating transmitting and receiving operations in the power line communication system. In Step S101, a process of acquiring the state of the transmission channel is performed. Specifically, the state of the transmission channel is estimated by measuring variation in CINR (Carrier to Interference and Noise Ratio, power ratio of carrier to power (interference+noise)) or SNR (Signal to noise ratio, power ratio of carrier to power) of every sub-carrier or variation in the number of errors (error ratio), the number of retransmission of the transmission data, or a retry ratio. Subsequently, in Step S102, a process of acquiring the communication parameter (the number of information bits assigned to each carrier (primary modulation method) or a parameter of error correction or the like) is performed on the basis of the state of the transmission channel acquired in Step S101. FIG. 8 is a diagram illustrating assignment of information bits to each sub-carrier. When the CINR in every frequency (carrier) is detected, as shown in FIG. 8A, bits are assigned, as shown in FIG. 8B. That is, numerous information bits are assigned to a carrier having a large CINR.

In the process of Steps S101 and S102, channel estimation (hereinafter, abbreviated as "CE") is performed. Since the state of the transmission channel typically varies with time, the CE is performed periodically or at the time of detecting the variation in the state of the transmission channel and the communication parameter is obtained at that time.

In Step S103, a frame determining process of determining the communication parameter and the frame format of the communication frame used for subsequent communication is performed using the communication parameter (hereinafter, also referred to as "a new parameter") obtained in Step S102. This process is a CE training process used to confirm which one of a communication parameter (hereinafter, also referred to as "a current parameter") which is currently used and the communication parameter (hereinafter, also referred to as "a new parameter") obtained in Step S102 is suitable for the transmission channel to determine the communication parameter to be used for subsequent communication.

Specifically, communication is carried out using the respective communication parameters for some communication period and the retry ratio (error ratio) is obtained. Then, a communication parameter having the largest value among products of communication rates (hereinafter, also referred to as "PHY rates") and a value of (1−retry ratio) in the physical layer at the time of carrying out the communication using the respective communication parameters is used as the new communication parameter. At this time, the PHY rate can be calculated from the communication parameters. That is, an equation of PHY rate=(total of information bits assigned to each carrier)×coding rate/symbol length is satisfied.

When communication is carried out using the new parameter, the frame format containing the pilot symbol and the frame format containing no pilot symbol are both used, if necessary, and the current parameter or the new parameter is selected along with the frame format. The CE training process will be described in detail below.

In Step S104, the communication is performed using the communication parameter and the frame format of the communication frame determined by the above-described process. This process is performed by the main IC 210 shown in FIG. 4. In Step S103, the products of the PHY rates and the value of (1−retry ratio) have been used as a reference for selecting the communication parameters, but a MAC rate may also be used. As for the MAC rate, an equation of MAC rate=PHY rate×(1−retry ratio)×conversion efficiency is satisfied. In this case, on the assumption that PLD is a length [μsec] of the payload, PR is a length [μsec], FC is a length [μsec] of the frame control, GAP is a length [μsec] of a gap interval, and PLT is a length [μsec] of the pilot symbol, an equation of conversion efficiency=PLD [μsec]/(PR [μsec]+ FC [μsec]+PLD [μsec]+GAP [μsec]) is satisfied when the pilot symbol is not inserted. When the pilot symbol is inserted, an equation of conversion efficiency=PLC [μsec]/ (PR [μsec]+FC [μsec]+PLD [μsec]+GAP [μsec]+PLT [μsec]) is satisfied. When the MAC rate is used as a comparative parameter, the CE training process can be performed more precisely, compared to the case where PHY rate×(1−retry ratio) is used as the comparative parameter.

Figure 9:
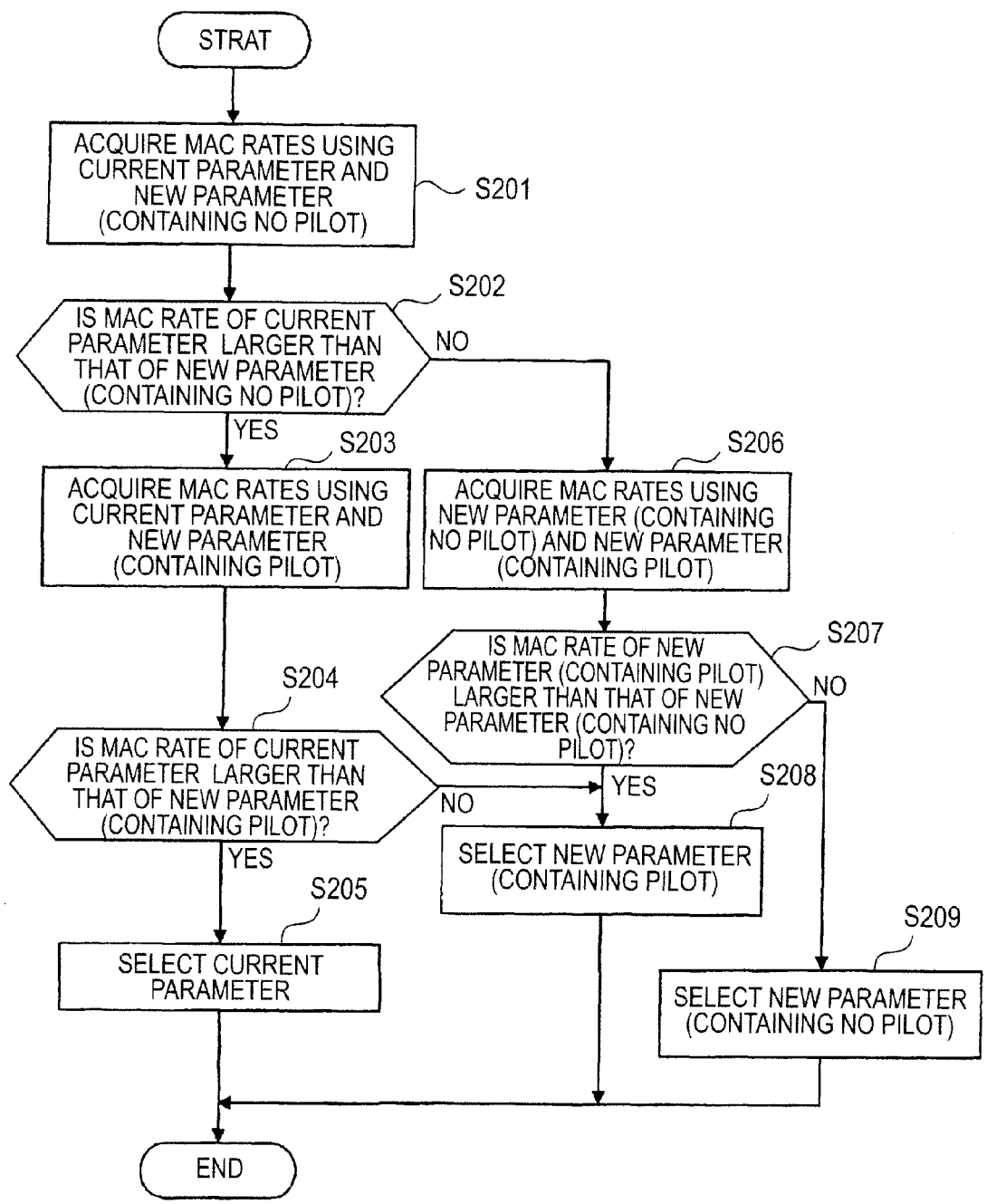
FIG. 9 is a flowchart illustrating an example of a CE training process in the power line communication system.

In a flowchart of the CE training process shown in FIG. 9, when the new parameter is obtained by the channel estimation (see Steps S101 and S102 in FIG. 7), the communication is carried out using the current parameter and the new parameter (where the pilot symbol is not inserted) to obtain the retry ratio and the MAC rate in Step S201. In this case, the current parameter contains the pilot symbol or contains no pilot symbol. That is, in the case where the frame format contains the pilot symbol in the current communication, the MAC rate in the case of containing the pilot symbol is obtained. Otherwise, the MAC rate in the case of containing no pilot symbol is obtained. Subsequently, in Step S202, the values of the MAC rates obtained in Step S201 are compared to each other. In addition, in this flowchart, the MAC rate is used as the comparative parameter, but PHY rate×(1−retry ratio) may be used as the comparative parameter.

When the MAC rate of the current communication parameter is determined to be larger from the comparison result in Step S202, the communication is carried out using the current parameter and the new parameter (where the pilot symbol is inserted) to obtain the retry ratio and also the MAC rates (Step S203). Subsequently, in Step S204, the values of the MAC rates obtained in Step S203 are compared to each other.

When the MAC rate of the current communication parameter is determined to be larger from the comparison result in Step S204, the MAC rate of the current parameter becomes the largest rate. Accordingly, the current parameter is selected as the communication parameter to be used for the subsequent communication (Step S205). Alternatively, when the MAC rate of the current communication parameter is determined to be not large from the comparison result in Step S204, the MAC rate of the new parameter (where the pilot symbol is inserted) becomes the largest rate. Accordingly, the new parameter is selected as the communication parameter to be used for the subsequent communication and the frame format is set as a format containing the pilot symbol (Step S208).

Alternatively, when the MAC rate of the current parameter is determined to be not large from the comparison result in Step S202, the communication is carried out using the new parameter (where the pilot symbol is inserted) and the new parameter (where the pilot symbol is not inserted) to obtain the retry ratio and also the MAC rates (Step S206). Subsequently, in Step S207, the values of the MAC rates obtained in Step S206 are compared to each other.

When the MAC rate of the new parameter (where the pilot symbol is inserted) is determined to be larger from the comparison result in Step S207, the MAC rate of the new parameter (where the pilot symbol is inserted) becomes the largest rate. Accordingly, the new parameter is selected as the communication parameter to be used for the subsequent communication and the frame format containing the pilot symbol is set (Step S208). Alternatively, when the MAC rate of the new parameter (where the pilot symbol is inserted) is determined to be not larger from the comparison result in Step S207, the MAC rate of the new parameter (where the pilot symbol is not inserted) becomes the largest rate. Accordingly, the new parameter is selected as the communication parameter to be used for the subsequent communication and the frame format is set as a format containing no pilot symbol (Step S209).

When the CE training process is performed in accordance with the above-described steps, the communication can be carried out using the communication parameter having the largest MAC rate and the frame format. In the flowchart shown in FIG. 9, the current parameter and the new parameter (where the pilot symbol is not inserted) are first used for the communication to obtain the MAC rate. However, the current parameter and the new parameter (where the pilot symbol is inserted) may be first used for the communication. Alternatively, the current parameter, the new parameter (where the pilot symbol is inserted), and the new parameter (where the pilot symbol is not inserted) may be first used for the communication, and then the MAC rates thereof are compared to each other.

Figure 10:
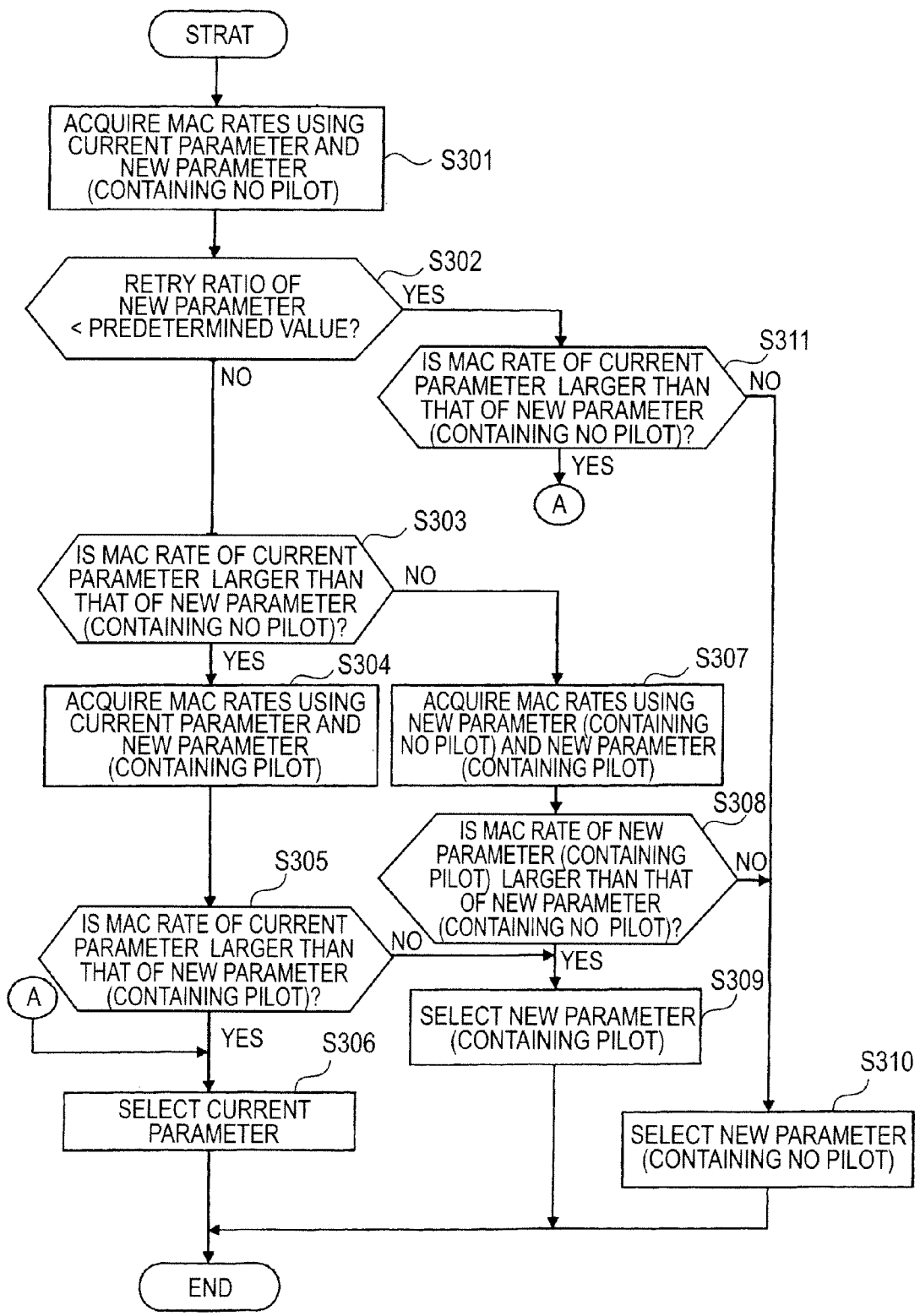
FIG. 10 is a flowchart illustrating another example of the CE training process in the power line communication system.

FIG. 10 is a flowchart illustrating another example of the CE training process. In the flowchart shown in FIG. 10, the communication is carried out using the current parameter and the new parameter (where the pilot symbol is not inserted) in Step S301, like the flowchart shown in FIG. 9, to obtain the retry ratio and also the MAC rate. Subsequently, in Step S302, the retry ratio is compared to a predetermined value in the case of the new parameter (where the pilot symbol is not inserted).

When the retry ratio is smaller than the predetermined value from the comparison result in Step S302, the process proceeds to Step S311. In Step S311, the values of the MAC rates obtained in Step S301 are compared to each other. When the MAC rate of the current parameter is larger, the current parameter is selected as the communication parameter to be used for the subsequent communication (Step S306). Alternatively, when the MAC rate of the current parameter is not larger from the comparison result, the new parameter is selected as the communication parameter to be used for the subsequent communication and the frame format is set as a format containing no pilot symbol (Step S310).

As apparent from the above description, when the retry in the new parameter (where the pilot symbol is not inserted) is determined to be smaller than the predetermined value from the comparison result in Step S302, a bit error in the new parameter (where the pilot symbol is not inserted) is determined to be sufficiently small, and thus acquisition of the MAC rate is omitted. Accordingly, it is preferable that the predetermined value in Step S302 is a value of the bit error which can be determined to be sufficiently small in the new parameter (where the pilot symbol is not inserted) in communication.

A difference point from the flowchart of FIG. 9 is that Steps S302 and S311 are more added in the flowchart of FIG. 10. In addition, when the retry ratio in the new parameter (where the pilot symbol is not inserted) is not smaller than the predetermined value from the comparison result in Step S302, the process moves to Step S303 to perform the CE training process like the flowchart of FIG. 9. Since Steps S303 to S310 of FIG. 10 are the same as Steps S202 to S209 of FIG. 9, description is omitted.

When the CE training process shown in FIG. 10 is performed in the above-described manner and when the retry ratio in the new parameter (where the pilot symbol is not inserted) is smaller than the predetermined value, time necessary for the CE training process can be reduced.

In the above-described CE training process, one of the communication frames where the pilot parameter is inserted or not inserted is used as the current parameter. However, the MAC rates may be compared to each other by carrying out the communication in both cases where the pilot parameter is inserted or not inserted. Alternatively, after the acquiring of the retry ratio of the current parameter is omitted, the retry ratios of the new parameters (where the pilot symbol is inserted and not inserted) are obtained and the MAC rates are compared to each other, the communication parameter and the communication frame to be actually used for the communication may be determined.

The acquiring of the information on the above-described transmission channel is performed by the PLC MAC block 212 and the PLC PHY block 213. The generating of the communication frame is performed by the pilot symbol control unit 15. The determining whether the pilot symbol is inserted is performed by the CPU 211. The inserting of the pilot symbol is controlled by the pilot symbol unit 15. The functions of the pilot symbol control unit 15 are performed by the above-described PLC PHY block 213.

The CE training process is performed at a periodic interval (for example, at every 30 seconds). However, when the state of the transmission channel is abruptly changed, the CE training process may be performed at that time. Accordingly, even when the state of the transmission channel is abruptly changed, the communication parameter can be appropriately selected and the determining whether the pilot symbol is inserted can be appropriately performed. Therefore, it is possible to realize normally stable communication.

The communication apparatus may further include a state information acquirer which acquires state information indicating a state of the transmission channel; and a determiner which determines a necessity whether the pilot symbol is inserted into the communication frame or not based on the state information. The controller controls to insert the pilot symbol into the communication frame based on a determined result by the determiner.

In the communication apparatus according to the second aspect of the invention, whether to be necessary to insert the pilot symbol in the communication frame is determined on the basis of the state of the transmission channel and the inserting of the pilot symbol in the communication frame is controlled on the determination result. Therefore, since it is possible to appropriately insert the pilot symbol in the communication frame, the reduction of the transmission efficiency caused due to the redundancy of the pilot symbol can be reduced.

The communication apparatus may further include a transmitter which transmits the communication frame to the another communication apparatus.

The communication apparatus adjusts a duration of the pilot symbol based on the state information.

Since it is possible to avoid lengthening the time interval of the pilot symbol by controlling the time interval of the pilot symbol, the reduction of the transmission efficiency caused due to the redundancy of the pilot symbol can be reduced.

The communication apparatus may further include an information assigner which assigns information indicating a presence of the pilot symbol to the communication frame.

Since an apparatus having received the communication frame can analyze the information and recognize whether the pilot symbol is present or not in the communication frame by allocating the information on whether the pilot symbol is present or no to the communication frame, data can be appropriately acquired from the communication frame.

In the communication apparatus, the communication includes a multi-carrier communication.

In the communication apparatus, multi-carrier communication includes OFDM communication.

In the communication apparatus, the transmission channel includes a power line.

The communication apparatus further includes a communication parameter acquirer which acquires a communication parameter used in the communication based on the state information. The communication frame generator generates the communication frame based on the communication parameter.

It is possible to allow a format of the communication frame to be suitable for the state of the transmission channel by acquiring the communication parameter used for communication on the basis of the state information corresponding to the state of the transmission channel and generating the communication frame on the basis of the communication parameter. In this way, the transmission efficiency can be improved.

In the communication apparatus, the state information acquirer acquires first state information indicating a first state of the transmission channel and second state information indicating a second state of the transmission channel differed from the first state. The communication parameter acquirer acquires first and second communication parameters based on the first and second state information. The communication frame generator generates first and second communication frames based on the first and second communication parameters. The communication apparatus further includes a communication performance acquirer acquires a first communication performance corresponding to the first communication parameter, and a second communication performance corresponding to the second communication parameter; a comparator which compares the first communication performance with the second communication performance; and a selector which selects one of the first and second communication frames as the communication frame used for transmitting the data on the basis of a compared result by the comparator.

Since it is possible to select the format of the communication frame suitable for the state of the transmission channel by comparing the first communication performance corresponding to the first communication parameter and the second communication performance corresponding to the second communication parameter one another to use the communication parameter having a higher communication performance, the transmission efficiency can be improved.

In the communication apparatus, the determiner determines a necessity whether the pilot symbol is inserted into the first communication frame and the second communication frame, and the controller controls to insert the pilot symbol regarding at least one of the first communication frame and the second communication frame based on a determined result by the determiner.

Since whether to be necessary to insert the pilot symbol in at least one of the first and second communication frames is determined and the inserting of the pilot symbol in at least one of the first and second communication frames is controlled on the basis of the determination result, the format of the communication frame suitable for the state of the transmission channel can be selected. Therefore, the transmission efficiency can be improved.

In the communication apparatus, the state information includes at least one of a carrier to interference and noise ratio, signal to noise ratio, an error ratio of transmission, number of data retransmission, and a retry ratio.

In another communication apparatus, the another communication apparatus receives the communication frame transmitted from the communication apparatus according to the fifth aspect and includes a detector which detects the information indicating the presence of the pilot symbol, and a receiver which performs receiving process of the communication frame based on the information.

The information corresponding to whether the pilot symbol inserted in the communication frame is present or not is detected and the communication frame is received on the basis of the information. Therefore, data contained in the communication frame can be appropriately obtained.

In the communication apparatus, in the receiving process, the receiver performs a receiving process of the data stored in the communication frame with the pilot symbol removed.

By avoiding the pilot symbol inserted in the communication frame, it is possible to appropriately extract the data stored in the communication frame.

In the communication apparatus, the controller controls the number of the pilot symbols to be inserted in the communication frame on the basis of the state of the transmission channel.

Since it is possible to control the number of the pilot symbols to be inserted in the communication frame on the basis of the state of the transmission channel, the reduction of the retry ratio can be realized by increasing the number of the pilot symbols to be inserted in the communication frame when the date of the transmission channel gets worse. Moreover, the communication efficiency can be improved by decreasing the number of the pilot symbols to be inserted in the communication frame when the state of the transmission channel is good.

The communication method further includes acquiring state information indicating a state of the transmission channel, and determining a necessity whether the pilot symbol is inserted into the communication frame or not based on the state information. It is controlled that the pilot symbol is inserted into the communication frame based on a determined result in the determining process.

In the communication method, whether to be necessary to insert the pilot symbol in the communication frame is determined on the basis of the state of the transmission channel and the inserting of the pilot symbol in the communication frame is controlled on the determination result. Therefore, since it is possible to appropriately insert the pilot symbol in the communication frame, the reduction of the transmission efficiency caused due to the redundancy of the pilot symbol can be reduced.

The communication method which further includes transmitting the communication frame to the another communication apparatus.

In the communication method, a duration of the pilot symbol is adjusted based on the state information.

Since it is possible to avoid lengthening the time interval of the pilot symbol by controlling the time interval of the pilot symbol, the reduction of the transmission efficiency caused due to the redundancy of the pilot symbol can be reduced.

The communication method further includes assigning information indicating a presence of the pilot symbol to the communication frame.

Since an apparatus having received the communication frame can analyze the information and recognize whether the pilot symbol is present or not in the communication frame by allocating the information on whether the pilot symbol is present or no to the communication frame, data can be appropriately acquired from the communication frame.

In the communication method, communication includes multi-carrier communication.

In the communication method, the multi-carrier communication includes OFDM communication.

In the communication method, the transmission channel includes a power line.

The communication method further includes acquiring a communication parameter used in the communication based on the state information. The communication frame is generated based on the communication parameter.

It is possible to allow a format of the communication frame to be suitable for the state of the transmission channel by acquiring the communication parameter used for communication on the basis of the state information corresponding to the state of the transmission channel and generating the communication frame on the basis of the communication parameter. In this way, the transmission efficiency can be improved.

The communication method further includes acquiring first state information indicating a first state of the transmission channel and second state information indicating a second state of the transmission channel differed from the first state; acquiring first and second communication parameters are acquired based on the first and second state information; acquiring first and second communication frames based on the first and second communication parameters; acquiring a first communication performance corresponding to the first communication parameter, and a second communication performance corresponding to the second communication parameter; comparing the first communication performance with the second communication performance; and selecting one of the first and second communication frames as the communication frame used for transmitting the data on the basis of a compared result in the comparing process.

Since it is possible to select the format of the communication frame suitable for the state of the transmission channel by comparing the first communication performance corresponding to the first communication parameter and the second communication performance corresponding to the second communication parameter one another to use the communication parameter having a higher communication performance, the transmission efficiency can be improved.

In the communication method, a necessity whether the pilot symbol is inserted into the first communication frame and the second communication frame is determined. It is controlled that the pilot symbol is inserted regarding at least one of the first communication frame and the second communication frame based on a determined result by the determiner.

Since whether to be necessary to insert the pilot symbol in at least one of the first and second communication frames is determined and the inserting of the pilot symbol in at least one of the first and second communication frames is controlled on the basis of the determination result, the format of the communication frame suitable for the state of the transmission channel can be selected. Therefore, the transmission efficiency can be improved.

In the communication method, the state information includes at least one of a carrier to interference and noise ratio, signal to noise ratio, an error ratio of transmission, number of data retransmission, and a retry ratio.

The communication method is receiving the communication frame transmitted from the communication method according to the fifth aspect. The method includes detecting the information indicating the presence of the pilot symbol, and performing receiving process of the communication frame based on the information.

The information corresponding to whether the pilot symbol inserted in the communication frame is present or not is detected and the communication frame is received on the basis of the information. Therefore, data contained in the communication frame can be appropriately obtained.

In the communication method, in the receiving process, a receiving process of the data stored in the communication frame is performed while removing the pilot symbol.

By avoiding the pilot symbol inserted in the communication frame, it is possible to appropriately extract the data stored in the communication frame.

In the communication method, the number of the pilot symbols to be inserted in the communication frame is controlled on the basis of the state of the transmission channel.

Since it is possible control the number of the pilot symbols to be inserted in the communication frame on the basis of the state of the transmission channel, the reduction of the ratio of the retransmission can be realized by increasing the number of the pilot symbols to be inserted in the communication frame when the date of the transmission channel gets worse. Moreover, the communication efficiency can be improved by decreasing the number of the pilot symbols to be inserted in the communication frame when the state of the transmission channel is good.

The invention is advantageous in realizing a communication apparatus, a communication method, and an integrated circuit capable of avoiding deterioration in transmission efficiency by redundantly inserting a pilot symbol.

This application is based upon and claims the benefit of priority of Japanese Patent Application No. 2007-225804 filed on Aug. 31, 2007, the contents of which are incorporated herein by reference in its entirety.

What is claimed is:

1. A communication apparatus connected to a transmission channel for transmitting data to another communication apparatus, the communication apparatus comprising:
   a communication frame generator which generates a first communication frame in which a pilot signal is inserted, and a second communication frame in which a pilot signal is not inserted; and
   a controller which controls an insertion of a pilot symbol into a third communication frame based on communication results of the first communication frame and the second communication frame,
   wherein the communication frame generator generates the third communication frame for storing the data.

2. The communication apparatus according to claim 1, further comprising:
   a state information acquirer which acquires state information indicating a state of the transmission channel; and
   a determiner which determines a necessity of whether the pilot symbol is inserted into the third communication frame or not based on the state information,
   wherein the controller controls an insertion of the pilot symbol into the third communication frame based on a determined result by the determiner.

3. The communication apparatus according to claim 2, wherein the communication frame generator adjusts a duration of the pilot symbol of the third communication frame based on the state information.

4. The communication apparatus according to claim 2, further comprising a communication parameter acquirer which acquires a communication parameter used in the communication based on the state information, wherein the communication frame generator generates the third communication frame based on the communication parameter.

5. The communication apparatus according to claim 4,
wherein the state information acquirer acquires first state information indicating a first state of the transmission channel and second state information indicating a second state of the transmission channel differed from the first state,
wherein the communication parameter acquirer acquires first and second communication parameters based on the first and second state information, and
wherein the communication frame generator generates fourth and fifth communication frames based on the first and second communication parameters,
wherein the communication apparatus further comprises:
a communication performance acquirer acquires a first communication performance corresponding to the first communication parameter, and a second communication performance corresponding to the second communication parameter;
a comparator which compares the first communication performance with the second communication performance; and
a selector which selects one of the fourth and fifth communication frames as the communication frame used for transmitting the data on the basis of a compared result by the comparator.

6. The communication apparatus according to claim 5,
wherein the determiner determines a necessity whether the pilot symbol is inserted into the fourth communication frame and the fifth communication frame, and
wherein the controller controls to insert the pilot symbol regarding at least one of the first communication frame and the second communication frame based on a determined result by the determiner.

7. The communication apparatus according to claim 2, wherein the state information includes at least one of a carrier to interference and noise ratio, signal to noise ratio, an error ratio of transmission, number of data retransmission, and a retry ratio.

8. The communication apparatus according to claim 2,
wherein the state information acquirer acquires a first transmission rate when transmitting the first communication frame and a second transmission rate when transmitting the second communication frame;
wherein the controller controls the communication frame generator to insert a pilot symbol into the third communication frame based on the first transmission rate and the second transmission rate.

9. The communication apparatus according to claim 2,
wherein the state information acquirer acquires a first retry ratio rate when transmitting the first communication frame and a second retry ratio when transmitting the second communication frame;
wherein the controller controls the communication frame generator to insert a pilot symbol into the third communication frame based on the first retry ratio and the second retry ratio.

10. The communication apparatus according to claim 1, further comprising a transmitter which transmits the third communication frame to the other communication apparatus.

11. The communication apparatus according to claim 1, further comprising an information assigner which assigns information indicating a presence of the pilot symbol to the third communication frame.

12. A communication apparatus which receives the third communication frame transmitted from the communication apparatus according to claim 11, comprising:
a detector which detects the information indicating the presence of the pilot symbol; and
a receiver which performs receiving process of the third communication frame based on the information.

13. The communication apparatus according to claim 12, wherein in the receiving process, the receiver performs a receiving process of the data stored in the third communication frame with the pilot symbol removed.

14. The communication apparatus according to claim 1, wherein the communication is a multi-carrier communication.

15. The communication apparatus according to claim 14, wherein the multi-carrier communication is an OFDM communication.

16. The communication apparatus according to claim 1, wherein the transmission channel is a power line.

17. The communication apparatus according to claim 1, wherein the controller controls number of the pilot symbols to be inserted into the third communication frame based on the state of the transmission channel.

18. A communication method of a communication apparatus connected to a transmission channel for transmitting data to another communication apparatus, the communication method comprising:
generating a first communication frame in which a pilot symbol is inserted, and a second communication frame in which a pilot signal is not inserted;
controlling an insertion of a pilot symbol into a third communication frame based on communication results of the first communication frame and the second communication frame; and
generating the third communication frame for storing the data.

19. An integrated circuit used in a communication apparatus connected to a transmission channel for transmitting data to another communication apparatus, the communication apparatus comprising:
a communication frame generator which generates a first communication frame in which a pilot signal is inserted, and a second communication frame in which a pilot signal is not inserted; and
a controller which controls an insertion of a pilot symbol into a third communication frame based on communication results of the first communication frame and the second communication frame,
wherein the communication frame generator generates the third communication frame for storing the data.

20. A communication apparatus connected to a transmission channel for transmitting data to another communication apparatus, the communication apparatus comprising:
a transmitter which transmits, to the other communication apparatus, a first communication frame in which a pilot signal is inserted, and a second communication frame in which a pilot signal is not inserted;
a communication frame generator which generates a third communication frame for storing the data; and
a controller which controls the insertion of a pilot symbol into the third communication frame based on communication results of the second communication frame and the third communication frame;
wherein the transmitter transmits the third communication frame to the other communication apparatus.

21. The communication apparatus according to claim 20, further comprising:
a state information acquirer which acquires state information indicating a state of the transmission channel; and
a determiner which determines a necessity of whether the pilot symbol is inserted into the third communication frame or not based on the state information,
wherein the controller controls an insertion of the pilot symbol into the third communication frame based on a determined result by the determiner.

22. The communication apparatus according to claim 21, wherein the communication frame generator adjusts a duration of the pilot symbol of the third communication frame based on the state information.

23. The communication apparatus according to claim 21, further comprising a communication parameter acquirer which acquires a communication parameter used in the communication based on the state information, wherein the communication frame generator generates the third communication frame based on the communication parameter.

24. The communication apparatus according to claim 23,
wherein the state information acquirer acquires first state information indicating a first state of the transmission channel and second state information indicating a second state of the transmission channel differed from the first state,
wherein the communication parameter acquirer acquires first and second communication parameters based on the first and second state information, and
wherein the communication frame generator generates fourth and fifth communication frames based on the first and second communication parameters,
wherein the communication apparatus further comprises:
a communication performance acquirer acquires a first communication performance corresponding to the first communication parameter, and a second communication performance corresponding to the second communication parameter;
a comparator which compares the first communication performance with the second communication performance; and
a selector which selects one of the fourth and fifth communication frames as the communication frame used for transmitting the data on the basis of a compared result by the comparator.

25. The communication apparatus according to claim 24,
wherein the determiner determines a necessity whether the pilot symbol is inserted into the fourth communication frame and the fifth communication frame, and
wherein the controller controls to insert the pilot symbol regarding at least one of the first communication frame and the second communication frame based on a determined result by the determiner.

26. The communication apparatus according to claim 21, wherein the state information includes at least one of a carrier to interference and noise ratio, signal to noise ratio, an error ratio of transmission, number of data retransmission, and a retry ratio.

27. The communication apparatus according to claim 21,
wherein the state information acquirer acquires a first transmission rate when transmitting the first communication frame and a second transmission rate when transmitting the second communication frame;
wherein the controller controls the communication frame generator to insert a pilot symbol into the third communication frame based on the first transmission rate and the second transmission rate.

28. The communication apparatus according to claim 21,
wherein the state information acquirer acquires a first retry ratio rate when transmitting the first communication frame and a second retry ratio when transmitting the second communication frame;
wherein the controller controls the communication frame generator to insert a pilot symbol into the third communication frame based on the first retry ratio and the second retry ratio.

29. The communication apparatus according to claim 20, further comprising an information assigner which assigns information indicating a presence of the pilot symbol to the third communication frame.

30. A communication apparatus which receives the third communication frame transmitted from the communication apparatus according to claim 29, comprising:
a detector which detects the information indicating the presence of the pilot symbol; and
a receiver which performs receiving process of the third communication frame based on the information.

31. The communication apparatus according to claim 30, wherein in the receiving process, the receiver performs a receiving process of the data stored in the third communication frame with the pilot symbol removed.

32. The communication apparatus according to claim 20, wherein the communication is a multi-carrier communication.

33. The communication apparatus according to claim 32, wherein the multi-carrier communication is an OFDM communication.

34. The communication apparatus according to claim 20, wherein the transmission channel is a power line.

35. The communication apparatus according to claim 20, wherein the controller controls number of the pilot symbols to be inserted into the third communication frame based on the state of the transmission channel.

* * * * *